(12) United States Patent
Covarrubias

(10) Patent No.: US 11,951,904 B1
(45) Date of Patent: Apr. 9, 2024

(54) ELECTRONIC SIGN ASSEMBLY

(71) Applicant: Rene Covarrubias, Riverside, CA (US)

(72) Inventor: Rene Covarrubias, Riverside, CA (US)

( * ) Notice: Subject to any disclaimer, the term of this patent is extended or adjusted under 35 U.S.C. 154(b) by 0 days.

(21) Appl. No.: 17/988,259

(22) Filed: Nov. 16, 2022

(51) Int. Cl.
*B60Q 1/50* (2006.01)
*B60Q 1/26* (2006.01)

(52) U.S. Cl.
CPC ........... *B60Q 1/549* (2022.05); *B60Q 1/2615* (2013.01); *B60Q 1/5035* (2022.05); *B60Q 1/2696* (2013.01)

(58) Field of Classification Search
CPC .... B60Q 1/549; B60Q 1/2615; B60Q 1/5035; B60Q 1/2696
See application file for complete search history.

(56) References Cited

U.S. PATENT DOCUMENTS

| | | | |
|---|---|---|---|
| 5,905,434 A | 5/1999 | Steffan | |
| 7,477,140 B1 * | 1/2009 | Booth | B60Q 1/52 345/82 |
| 7,696,865 B1 * | 4/2010 | Robinson | B60Q 1/549 40/442 |
| D825,801 S | 8/2018 | Cunningham, III | |
| 2004/0097195 A1 * | 5/2004 | Selleck | G09G 3/04 455/73 |
| 2011/0295697 A1 | 12/2011 | Boston | |
| 2014/0005860 A1 | 1/2014 | Chance | |
| 2014/0043156 A1 | 2/2014 | Howk, Jr. | |
| 2017/0140680 A1 | 5/2017 | Kucksdorf | |
| 2021/0146827 A1 | 5/2021 | Bush | |

FOREIGN PATENT DOCUMENTS

WO    WO2017103920    6/2017

* cited by examiner

*Primary Examiner* — Omeed Alizada

(57) ABSTRACT

An electronic sign assembly for communicating a message of gratitude to a motorist on a roadway includes a projector that is integrated into a vehicle such that the projector is directed toward a rear window of the vehicle. The projector projects an image onto the rear window to facilitate the image to be visible to a motorist driving behind the vehicle on a roadway. The projector projects a plurality of beams of light thereby facilitating the image to comprise the words "thank you" to express gratitude to the motorist behind the vehicle for allowing the vehicle to change lanes. A control is positioned within the vehicle thereby facilitating the control to be accessible to a driver of the vehicle. The control is in communication with the projector for turning the projector on and off.

4 Claims, 5 Drawing Sheets

ELECTRONIC SIGN ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to electronic sign devices and more particularly pertains to a new electronic sign device for communicating a message of gratitude to a motorist on a roadway. The device includes a projector that is mounted to rear dash of a vehicle such that the projector is directed toward a rear window of the vehicle. The device includes a control positioned in the vehicle for turning the projector on and off. The projector projects the words "thank you" onto the rear window to express gratitude to a motorist driving behind the vehicle on a roadway.

(2) Description of Related Art Including Information Disclosed Under 37 CFR 1.97 and 1.98

The prior art relates to electronic sign devices including a vehicle communication system which includes an electronic sign positioned on a rear dash of a vehicle for displaying a customized message. The prior art discloses a display mounted to a rear end of a vehicle which displays registration information of the vehicle. The prior art discloses a digital vanity device which includes a digital screen mounted within a vehicle that is in wireless communication with a personal electronic device for downloading a customized message into the digital screen. The prior art discloses a vehicle display device that includes an electronic sign and a communication port integrated into the electronic sign for importing customized messages into the electronic sign. The prior art discloses a variety of electronic sign devices that each at least includes an electronic placard that is mountable to an exterior of a vehicle.

BRIEF SUMMARY OF THE INVENTION

An embodiment of the disclosure meets the needs presented above by generally comprising a projector that is integrated into a vehicle such that the projector is directed toward a rear window of the vehicle. The projector projects an image onto the rear window to facilitate the image to be visible to a motorist driving behind the vehicle on a roadway. The projector projects a plurality of beams of light thereby facilitating the image to comprise the words "thank you" to express gratitude to the motorist behind the vehicle for allowing the vehicle to change lanes. A control is positioned within the vehicle thereby facilitating the control to be accessible to a driver of the vehicle. The control is in communication with the projector for turning the projector on and off.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
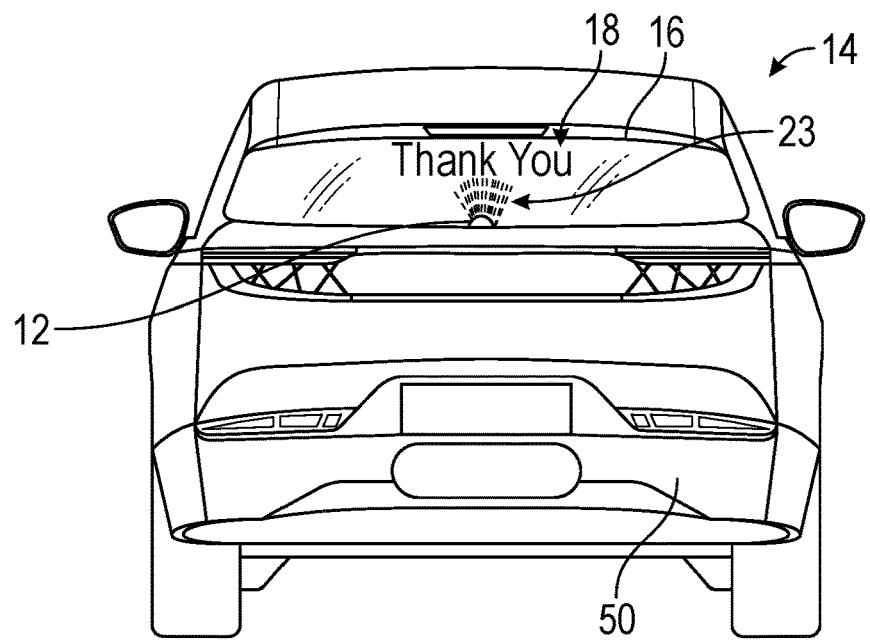
FIG. 1 is a back perspective view of an electronic sign assembly according to an embodiment of the disclosure.
Figure 2:
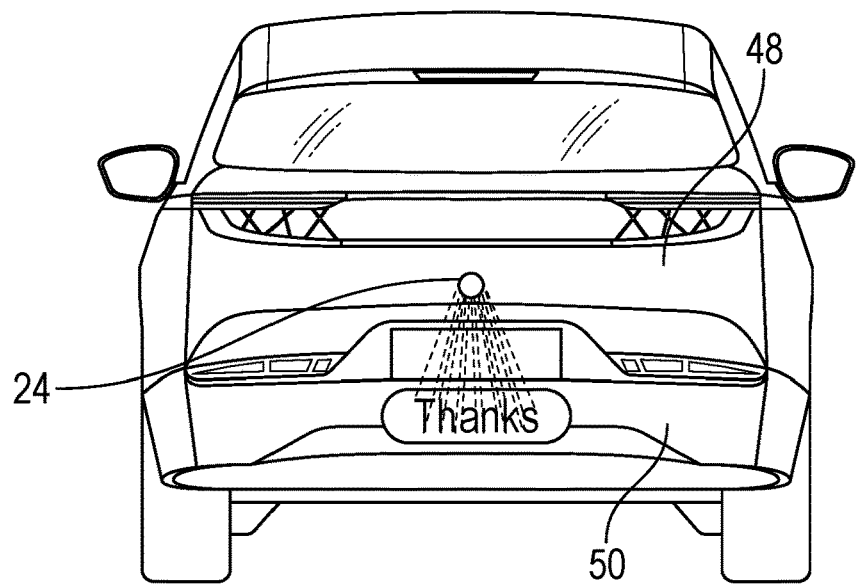
FIG. 2 is a back view of an embodiment of the disclosure showing a projector being mounted to a rear end of a vehicle.
Figure 3:
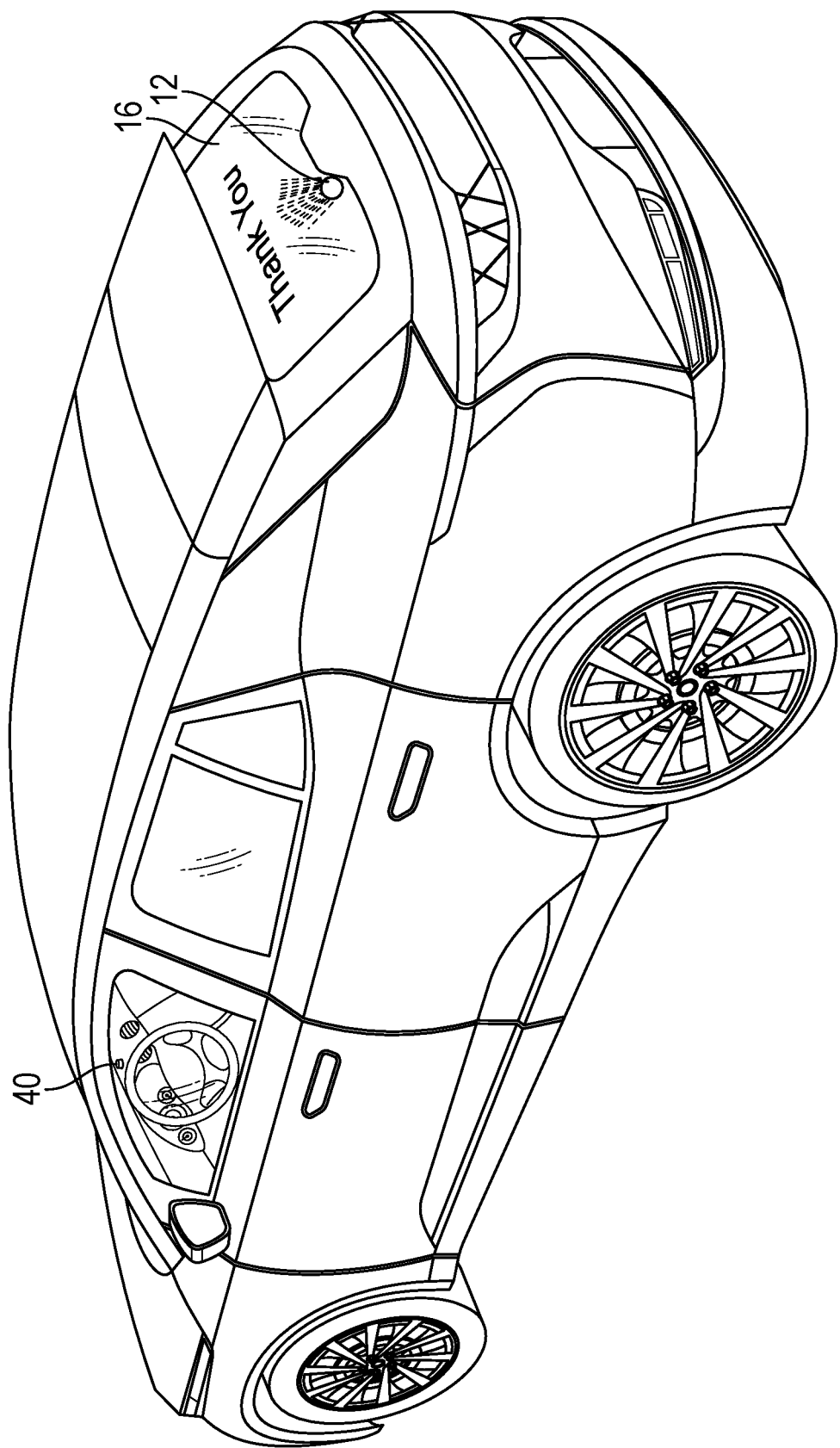
FIG. 3 is a perspective view of an embodiment of the disclosure.
Figure 4:
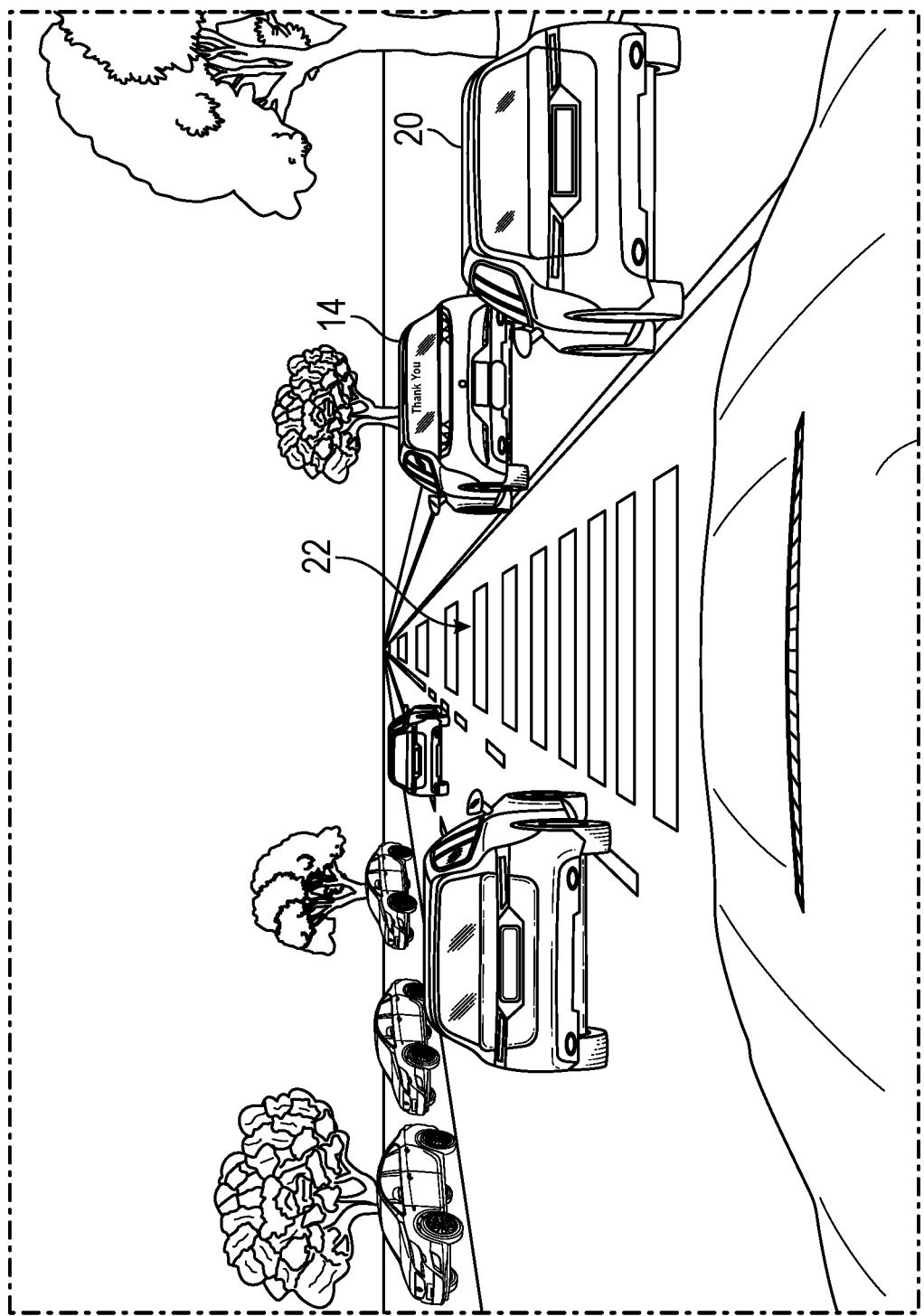
FIG. 4 is a perspective in-use view of an embodiment of the disclosure.
Figure 5:
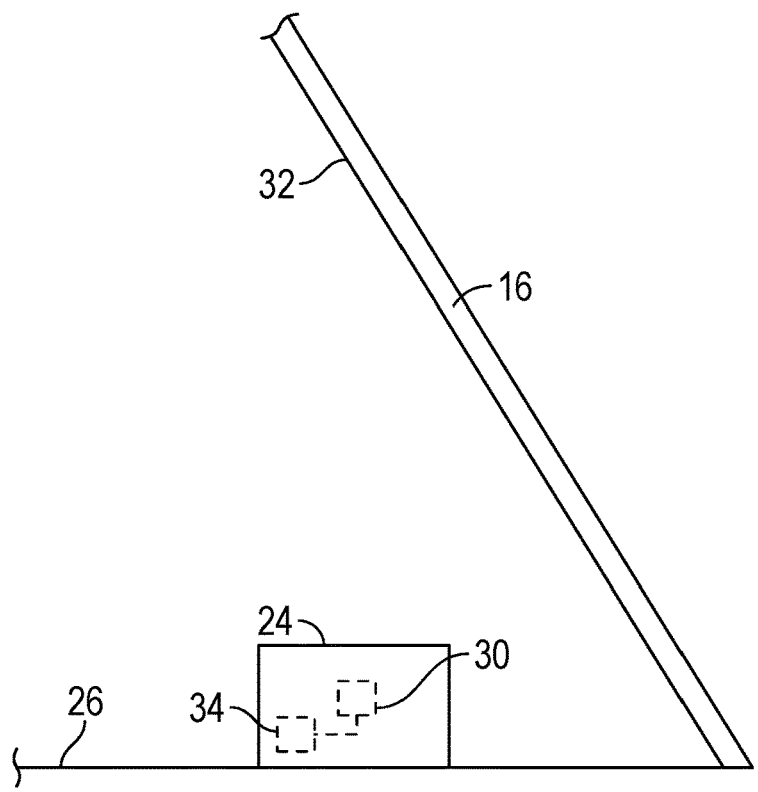
FIG. 5 is a perspective view of a projector of an embodiment of the disclosure.
Figure 6:
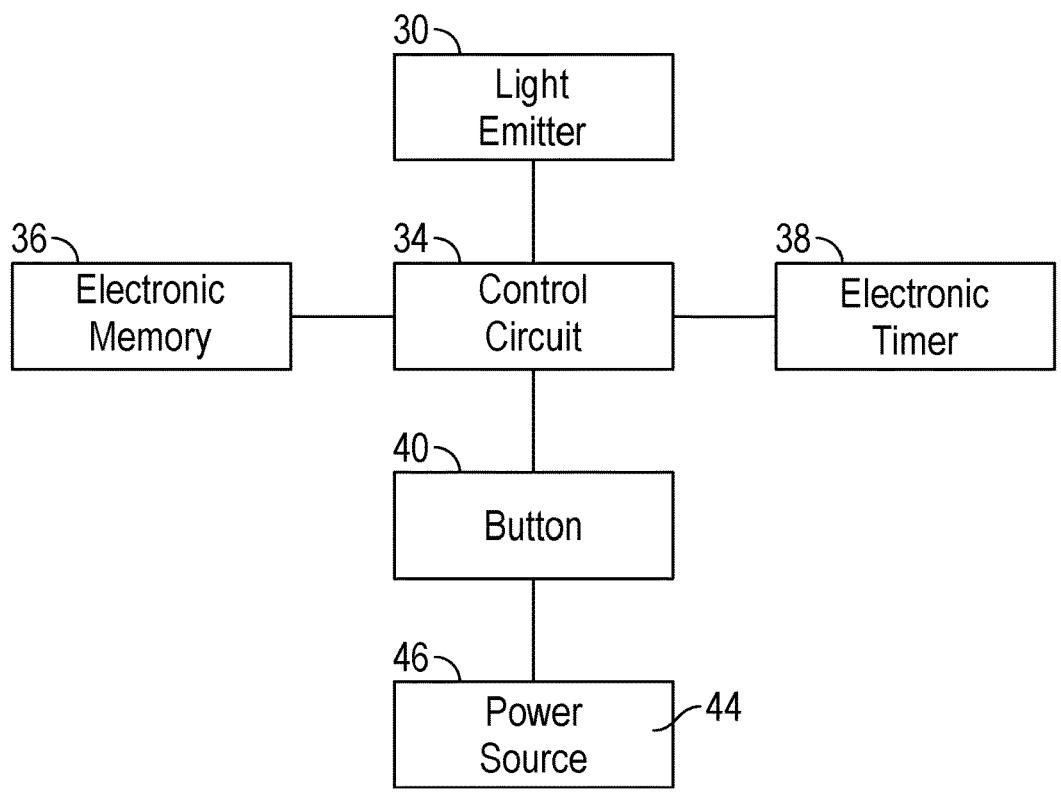
FIG. 6 is a schematic view of an embodiment of the disclosure.

With reference now to the drawings, and in particular to FIGS. 1 through 8 thereof, a new electronic sign device embodying the principles and concepts of an embodiment of the disclosure and generally designated by the reference numeral 10 will be described.

As best illustrated in FIGS. 1 through 8, the electronic sign assembly 10 generally comprises a projector 12 that is integrated into a vehicle 14 such that the projector 12 is directed toward a rear window 16 of the vehicle 14. The vehicle 14 may be a passenger vehicle, a cargo vehicle or any other type of motorized vehicle that is driven on public roadways and which has a rear window. The projector 12 projects an image 18 onto the rear window 16 to facilitate the image 18 to be visible to a motorist 20 driving behind the vehicle 14 on a roadway 22. Furthermore, the projector 12 projects a plurality of beams of light 23 thereby facilitating the image 18 to comprise the words "thank you". In this way the projector 12 can express gratitude to the motorist 20 behind the vehicle 14 for allowing the vehicle 14 to change lanes, to merge onto the roadway 22 or to perform other maneuvers on the roadway 22 that would typically involve the motorist 20 behind the vehicle 14 allowing the vehicle 14 to perform the maneuver.

The projector 12 comprises a housing 24 that is attached to a rear dash 26 of the vehicle 14. The projector 12 includes a lens 28 that is attached to the housing 24 and the lens 28 is directed toward the rear window 16. Additionally, the projector 12 includes a light emitter 30 that is integrated into the housing 24 and the light emitter 30 emits the plurality of beams of light 23 outwardly through the lens 28. The lens 28 is structured to have a focal point that is sufficiently distant from the lens 28 to facilitate the beams of light 23 to form the words "thank you" on an interior surface 32 of the rear window 16. Furthermore, the light emitter 30 may comprise a light emitting diode or other type of electronic light emitter and the light emitter 30 may emit light of a red color such that the words "thank you" are highly visible on the rear window 16.

The projector 12 includes a control circuit 34 that is positioned in the housing 24 and the control circuit 34 is electrically coupled to the light emitter 30. The control circuit 34 includes an electronic memory 36 which stores data comprising an operational program for the light emitter 30. Additionally, the control circuit 34 includes an electronic timer 38 that begins a countdown of a predetermined duration of time when the control circuit 34 actuates the light emitter 30. Furthermore, the control circuit 34 de-actuates the light emitter 30 when the electronic timer 38 completes counting down the predetermined duration of time.

A control 40 is positioned within the vehicle 14 thereby facilitating the control 40 to be accessible to a driver of the vehicle 14. The control 40 is in communication with the projector 12 for turning the projector 12 on and off. The control 40 comprises a button 42 that is urgeable into an on position and the button 42 is biased into an off position. The button 42 is electrically coupled to the control circuit 34 and the button 42 is electrically coupled to a power source 44 comprising an electrical system 46 of the vehicle 14. As is most clearly shown in FIG. 2, the housing 24 may be mounted to a rear end 48 of the vehicle 14 such that the lens 28 is directed toward a rear bumper 50 of the vehicle 14. In this way the light emitter 30 can project the words "thank you" onto the rear bumper 50 of the vehicle 14.

Figure 7:
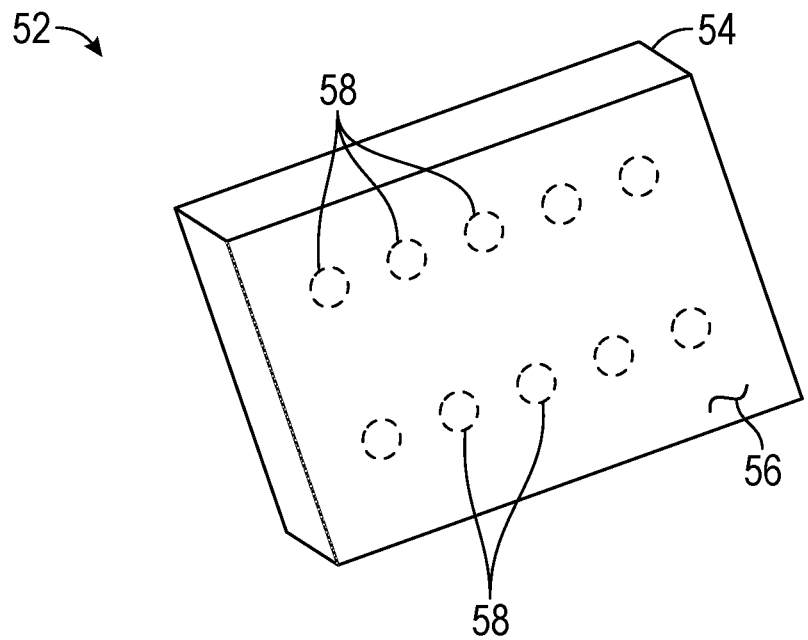
FIG. 7 is a perspective view of an alternative embodiment of the disclosure.

In an alternative embodiment 52 as is most clearly shown in FIG. 7, a panel 54 is provided which has an adhering surface 56. The adhering surface 56 comprises an adhesive material thereby facilitating the adhering surface 56 to adhere to the interior surface 32 of the rear window 16. In this way the panel 54 is visible to the motorist 20 driving behind the vehicle 14. Furthermore, the panel 54 is comprised of a translucent material to pass light through the panel 54.

Continuing in the alternative embodiment 52 a plurality of light emitters 58 is provided and each of the plurality of light emitters 58 is integrated within the panel 54. In this way each of the plurality of light emitters 58 in the panel 54 emits light outwardly through the panel 54. The plurality of light emitters 58 in the panel 54 is strategically arranged in the panel 54 to form the words "thank you". Additionally, each of the plurality of light emitters 58 in the panel 54 is electrically coupled to the button 42 and each of the plurality of light emitters 58 in the panel 54 is turned on when the button 42 is urged into the on position. The plurality of light emitters 58 in the panel 54 may comprise a light emitting diode or other type of electronic light emitter 30.

Figure 8:
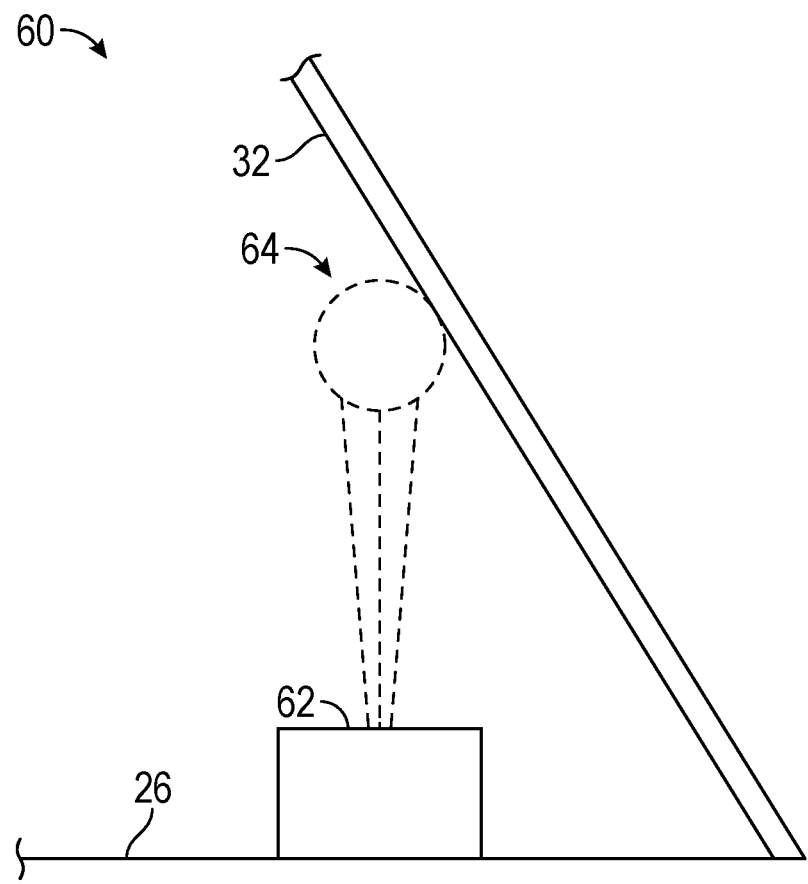
FIG. 8 is an interior perspective view of an alternative embodiment of the disclosure.

In an alternative embodiment 60 as is most clearly shown in FIG. 8, a holographic unit 62 is positioned on the rear dash 26 of the vehicle 14. The holographic unit 62 emits a holographic image 64 outwardly from the holographic unit 62 when the holographic unit 62 is turned on. Additionally, the holographic unit 62 is oriented on the rear dash 26 such that the holographic image 64 is projected to a point located adjacent to the interior surface 32 of the rear window 16. In this way the holographic unit 62 facilitates the holographic image 64 to be visible to the motorist 20 driving behind the vehicle 14. The holographic unit 62 is electrically coupled to the button 42 and the holographic unit 62 is turned on when the button 42 is urged into the on position.

In use, the driver depresses the button 42 when the motorist 20 driving behind the vehicle 14 allows the vehicle 14 to change lanes, the merge onto the roadway 22 or perform another maneuver as a result of the motorist 20 allowing the vehicle 14 to perform the maneuver. In this way the words "thank you" are visible to the motorist 20 behind the vehicle 14. Thus, the driver of the vehicle 14 can express their gratitude the motorist 20 driving behind the vehicle 14 for being a courteous driver. Furthermore, the motorist 20 driving behind the vehicle 14 can enjoy the feeling of being recognized for displaying courtesy on the roadway 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic sign assembly for displaying the word "thanks" on a rear of a vehicle to express appreciation for fellow motorists on a roadway, said assembly comprising:
  a projector being integrated into a vehicle such that said projector is positioned below a rear window of the vehicle and directed toward the rear of the vehicle below the housing, said projector projecting an image onto the rear of the vehicle wherein said projector is configured to facilitate the image to be visible to a motorist driving behind the vehicle on a roadway, said projector projecting a plurality of beams of light thereby facilitating said image to comprise the words "thanks" wherein said projector is configured to express gratitude to the motorist behind the vehicle for allowing the vehicle to change lanes; and a control being positioned within the vehicle thereby facilitating said control to be accessible to a driver of the vehicle, said control being in communication with said projector for turning said projector on and off;

wherein said projector includes: a housing being attached to the rear of the vehicle;

a lens being attached to said housing, said lens being directed toward the rear of the vehicle below the housing;

a light emitter being integrated into said housing;

a control circuit being positioned in said housing, said control circuit being electrically coupled to said light emitter, said control circuit including an electronic memory storing data comprising an operational program for said light emitter;

wherein said control comprises a button being pressed into an on position, said button being biased into an off position, said button being electrically coupled to said control circuit, said button being electrically coupled to a power source comprising an electrical system of the vehicle, said control circuit actuating said light emitter for a predetermined amount of time when said button is pressed into said on position, said control circuit de-actuating said light emitter when said predetermined amount of time has elapsed.

2. The assembly according to claim 1, wherein said projector comprises:

a housing being attached to the rear of the vehicle below a rear window of the vehicle; and a lens being attached to said housing, said lens being directed toward the rear of the vehicle below the housing.

3. The assembly according to claim 2, wherein said projector includes a light emitter being integrated into said housing, said light emitter emitting the plurality of beams of light outwardly through said lens, said lens being structured to have a focal point being sufficiently distant from said lens to facilitate the beams of light to form the word "thanks" on an exterior surface of the rear of the vehicle.

4. An electronic sign assembly for displaying the word "thanks" on a rear of a vehicle to express appreciation for fellow motorists on a roadway, said assembly comprising:

a projector being integrated into a vehicle such that said projector is positioned below a rear window of the vehicle and directed toward the rear of the vehicle below the housing, said projector projecting an image onto the rear of the vehicle wherein said projector is configured to facilitate the image to be visible to a motorist driving behind the vehicle on a roadway, said projector projecting a plurality of beams of light thereby facilitating said image to comprise the word "thanks" wherein said projector is configured to express gratitude to the motorist behind the vehicle for allowing the vehicle to change lanes, said projector comprising:

a housing being attached to the rear of the vehicle;

a lens being attached to said housing, said lens being directed toward the rear of the vehicle;

a light emitter being integrated into said housing, said light emitter emitting the plurality of beams of light outwardly through said lens, said lens being structured to have a focal point being sufficiently distant from said lens to facilitate the beams of light to form the word "thanks" on an exterior surface of the rear of the vehicle below the housing; and a control circuit being positioned in said housing, said control circuit being electrically coupled to said light emitter, said control circuit including an electronic memory storing data comprising an operational program for said light emitter; and a control being positioned within the vehicle thereby facilitating said control to be accessible to a driver of the vehicle, said control being in communication with said projector for turning said projector on and off, said control comprising a button being urgeable into an on position, said button being biased into an off position, said button being electrically coupled to said control circuit, said button being electrically coupled to a power source comprising an electrical system of the vehicle, said control circuit actuating said light emitter for a predetermined amount of time when said button is urged into said on position, said control circuit de-actuating said light emitter when said predetermined amount of time has elapsed.

* * * * *